United States Patent
Endriss et al.

(10) Patent No.: US 10,407,926 B2
(45) Date of Patent: Sep. 10, 2019

(54) SEALING PLUG FOR CLOSING AN ANCHOR HOLE IN A CONCRETE WALL

(71) Applicant: Peri GmbH, Weissenhorn (DE)

(72) Inventors: Philip Endriss, Vöhringen (DE); Matthias Konrad, Weissenhorn (DE)

(73) Assignee: PERI GMBH, Weissenhorn (DE)

( * ) Notice: Subject to any disclaimer, the term of this patent is extended or adjusted under 35 U.S.C. 154(b) by 199 days.

(21) Appl. No.: 15/608,933

(22) Filed: May 30, 2017

(65) Prior Publication Data

US 2017/0260760 A1 Sep. 14, 2017

Related U.S. Application Data

(63) Continuation of application No. PCT/EP2015/077697, filed on Nov. 25, 2015.

(30) Foreign Application Priority Data

Dec. 5, 2014 (DE) .......................... 10 2014 224 971

(51) Int. Cl.
*E04G 17/06* (2006.01)
*F16B 13/08* (2006.01)
(Continued)

(52) U.S. Cl.
CPC .......... *E04G 17/0644* (2013.01); *F16B 13/08* (2013.01); *E04G 17/06* (2013.01);
(Continued)

(58) Field of Classification Search
CPC . E04G 17/0644; E04G 17/0751; E04G 17/06; E04G 2017/0627; E04G 2017/0629;
(Continued)

(56) References Cited

U.S. PATENT DOCUMENTS 2,150,866 A * 3/1939 Sipe ...................... F16B 13/025
285/295.1
2,724,366 A * 11/1955 Miessner ................. B43K 5/00
401/151

(Continued)

FOREIGN PATENT DOCUMENTS

AT          246 506 B    4/1966
DE        1 915 766 U    5/1965
(Continued)

*Primary Examiner* — Nathan Cumar
(74) *Attorney, Agent, or Firm* — Hackler Daghighian Martino & Novak

(57) ABSTRACT

A sealing plug has an elastic sleeve of thimble-like basic shape. A wound-up band of the sealing plug is inserted in the sleeve. The number of windings or turns of the band can be reduced by rotating the inner end of the band, wherein the outside diameter of the band, and hence the outside diameter of the elastic sleeve, widens. The band can be inserted in pretensioned state into the sleeve and can slacken after insertion into an anchor hole. The band can be expanded in the anchor hole beyond the slackened state of the band. The sealing plug further has a latching mechanism, which prevents back-rotation of the expanded sleeve. The sealing plug enables a radial expansion, and hence a sealing of anchor holes of different diameter, without shortening of the axial sealing surface of the sleeve.

20 Claims, 4 Drawing Sheets

(51) Int. Cl.
  *E04G 17/075* (2006.01)
  *F16B 13/02* (2006.01)
  *F16B 13/00* (2006.01)

(52) U.S. Cl.
  CPC ........ *E04G 17/075* (2013.01); *E04G 17/0751* (2013.01); *F16B 13/025* (2013.01); *F16B 2013/006* (2013.01)

(58) Field of Classification Search
  CPC ................ E04G 17/064; E04G 17/075; E04G 2017/0646; F16B 13/08; F16B 13/025; F16B 2013/006
  USPC .......................................................... 277/650
  See application file for complete search history.

(56) References Cited

U.S. PATENT DOCUMENTS 2,955,504 A * 10/1960 Lovrinch .............. F16B 13/066
  411/51

7,954,822 B2 * 6/2011 Matsushima ............ F16J 9/062
  277/434

2009/0025358 A1 * 1/2009 Woodford ............ A01D 89/002
  56/364

FOREIGN PATENT DOCUMENTS

| | | |
|---|---|---|
| DE | 86 00 358 U1 | 2/1986 |
| DE | 36 27 627 A1 | 2/1988 |
| DE | 93 07 284 U1 | 7/1993 |
| DE | 94 14 703 U1 | 7/1995 |
| DE | 20 2009 018 645 U1 | 6/2012 |
| DE | 10 2013 006 532 A1 | 10/2014 |
| DE | 10 2013 206 576 A1 | 10/2014 |
| GB | 1 548 964 A | 7/1979 |
| WO | 2016 087288 A1 | 6/2016 |

* cited by examiner

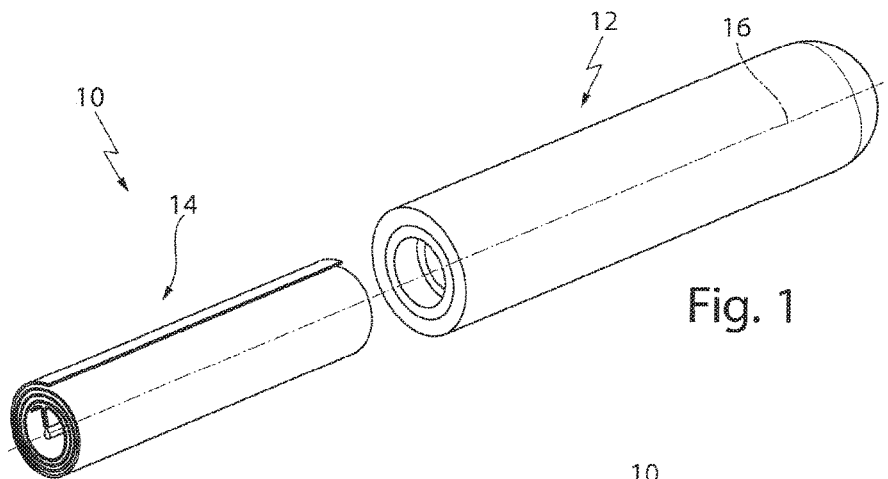
Fig. 1
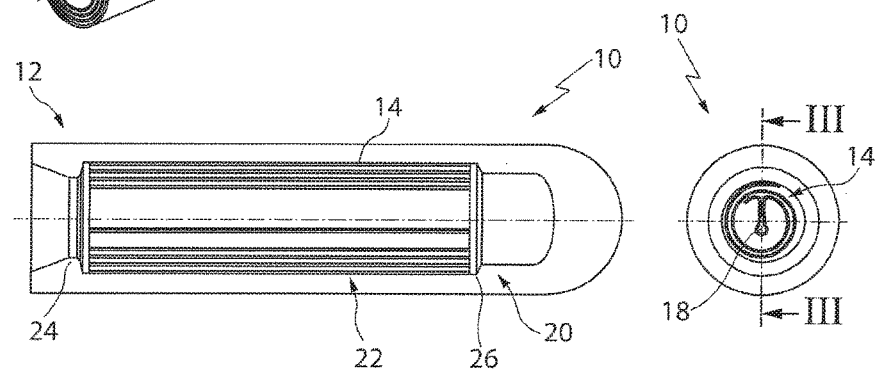
Fig. 3
Fig. 2
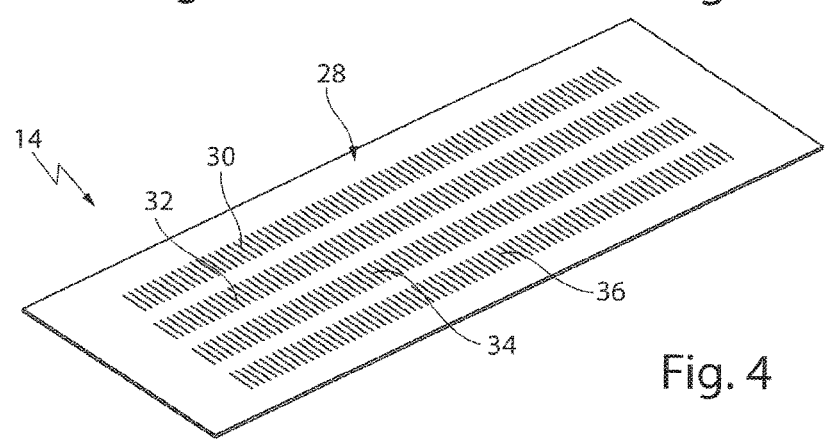
Fig. 4

SEALING PLUG FOR CLOSING AN ANCHOR HOLE IN A CONCRETE WALL

CROSS-REFERENCE TO RELATED APPLICATIONS

This continuation application claims priority to PCT/EP2015/077697 filed on Nov. 25, 2015 which has published as WO 2016/087288 A1 and also the German application number 10 2014 224 971.6 filed on Dec. 5, 2014, the entire contents of which are fully incorporated herein with these references.

DESCRIPTION

Field of the Invention

The invention relates to a sealing plug for closing an anchor hole in a concrete wall, wherein the sealing plug has at one end a closed sleeve. The invention further relates to a sealing device comprising such a sealing plug.

Background of the Invention

In the creation of a concrete wall using a formwork technology, a formwork is generally set up on both sides of the wall to be created. This is sometimes referred to as a double-headed formwork. The concrete pressure which is generated in the pouring of the concrete into the double-headed formwork and which weighs on the two forms is in this case absorbed by means of form ties. The form ties are generally incorporated in sheaths in order to allow reuse of the form ties. The sheaths are normally cylindrical and remain in the concrete. In the case of one-sided anchorage, which is generally realized with conical form ties, no sheath is usually used.

Following the drying or setting of the concrete, the form tie is removed, so that an anchor hole is left in the concrete wall. In the case of one-sided anchorage, the anchor hole can be of conical configuration.

The described anchor holes are closed with sealing plugs.

From DE 20 2009 018 645 U1, a sealing plug for closing anchor holes, which consists of an elastomer, has become known. The known sealing plug is pushed in the direction of its longitudinal axis into the anchor hole. As a result, no durable watertight closure of the anchor hole at high prevailing water pressures can, however, be achieved.

In addition, from DD 278 370 A1, a watertight form tie culvert, in which the seal is realized by means of an expansion disk and mortar, has become known. Following the introduction of the expansion disk into the anchor hole, the expansion disk is here widened with a forcer, so that the expansion disk is driven into the concrete of the concrete wall. However, this calls for a removal of the sheath. Furthermore, the concrete wall is damaged by the expansion of the expansion disk.

In addition, in construction engineering, a sealing plug for closing anchor holes, which consists of a flexible sealing ring penetrated by a screw, wherein the screw is locked by a nut, has already been known for a very long time. By rotation of the screw, the sealing ring is pressed in the longitudinal direction of the screw between a screw head of the screw and the nut. The sealing ring is hereby expanded radially to the longitudinal direction of the screw. It is here disadvantageous, however, that the sealing ring, upon the rotation of the screw, is twisted relative to the nut. Over time, the sealing ring twists back in the anchor hole (retorsion) and thus loses tension and leaks tightness.

A sealing plug stated in the introduction has become known from DE 10 2013 206 576 A1.

In addition, DE 36 27 627 A1 discloses an injection packer for pressing liquid substances, in particular plastics, through a borehole made in a defective concrete body.

A packer for sealing boreholes in walls or the like has additionally become known from DE 86 00 358 U1, DE 88 00 265 U1, DE 94 14 703 U1 and EP 0 642 620 B1. Finally, US 2009/0025328 A1 discloses a sealing plug in which an elastic plastics body is compressed between two nuts in the direction of the longitudinal axis of the sealing plug and is thereby radially widened.

In the mechanically sealing sealing plugs known from the prior art, a substantially cylindrical, soft sealing body is thus pressed in the axial direction in order to obtain a radial expansion.

In the case of an anchor hole with large inside diameter, the sealing body must be strongly axially pressed, thus seals only over a short axial length. The sealing effect is thereby reduced. If a good seal is intended to be realized over a large axial length, if sealing plugs according to the prior art are used, then further sealing plugs with larger diameters must therefore be stocked.

SUMMARY OF THE INVENTION

The object of the present invention is thus to enable sealing by a single sealing plug for a multiplicity of anchor holes with different inside diameters and/or conical diameter course, wherein the sealing plug seals over a large axial length.

This object is achieved according to the invention by a sealing plug as claimed in patent claim 1. The subclaims represent preferred refinements.

The object according to the invention is thus achieved by a sealing plug for closing an anchor hole in a concrete wall, wherein the sealing plug has a sleeve which is closed at one end and wherein the sealing plug has in the sleeve a wound band for the expansion of the sleeve.

The object according to the invention is hence achieved by an at least partially wound-up band, which is able to be at least partially unwound. As a result of the unwinding, the outside diameter of the band is enlarged, whereby the outside diameter of the sleeve is expanded. A shortening of the sleeve in the axial direction does not occur. The sealing plug according to the invention can thus be used to close anchor holes of different diameters, wherein the axial sealing length of the sealing plug in anchor holes with large inside diameter is not shortened.

Within this patent application, the direction of the longitudinal axis of the sealing plug is referred to as axial, while a direction perpendicular to the longitudinal axis is referred to as radial.

The band is preferably wound about the longitudinal axis of the sealing plug. The band can be introduced in tightly wound state into the sleeve, where it slackens and radially expands the sleeve. The expansion of the band here occurs after the introduction of the sealing plug into the anchor hole, so that the sleeve is pressed radially against the inner wall of the anchor hole.

In a particularly preferred embodiment of the invention, the sleeve is configured in one piece. A particularly reliable seal and a simple design of the sealing plug can thereby be obtained.

In order to achieve a high durability of the sealing plug combined with, at the same time, snug fitting of the sealing plug to the inner wall of the anchor hole, the sleeve is preferredly formed at least partially of plastic. The sleeve is preferably formed fully of plastic. The plastic can have a Shore hardness of 30 ShoreA to 80 ShoreA, in particular of 40 ShoreA to 70 ShoreA, preferably of 50 ShoreA to 60 ShoreA.

Particularly preferredly, the sleeve is formed at least partially, in particular fully, of an elastomer. As the elastomer, polyurethane (PU) is preferredly used. Alternatively or additionally thereto, the sleeve can be formed at least partially, in particular fully, of a thermoplastic. As the thermoplastic, thermoplastic polyurethane (TPU) is preferredly used.

For the rotation of the radially inner end of the band about the longitudinal axis of the sealing plug, the band can have at one end a rotating projection which is configured for reception in a rotary tool. The rotary tool in question is preferredly a rotary hand tool or a hand drill.

The sealing plug is of particularly simple design if the rotating projection on the band is canted.

Preferably, the band is formed of steel, in particular of stainless steel. Particularly preferredly, the band is formed of spring steel, in particular with a yield point Re of more than 2500 N/mm$^2$.

In the case of a particularly simply designed sealing plug, the object according to the invention is thus achieved by a sealing plug having a pretensioned band, in particular made of spring steel, wherein the band, after the sealing plug has been introduced into an anchor hole, can be slackened and thereby expands. In this case, a rotation of the band after the introduction of the sealing plug is no longer necessary.

The sealing plug can have a latching mechanism. The, in particular radial, expansion of the sleeve can hence be maintained over a long time span, irrespective of the weakening of the tensioning force of the band.

The latching mechanism is preferredly configured such that a radial expansion of the band can easily be realized, whereas reeling-in of the band is blocked by the latching mechanism. Preferredly, the latching mechanism has for this purpose at least one oblique face, in particular a plurality of oblique faces.

In a particularly preferred embodiment of the sealing plug, the band is configured in one piece with the latching mechanism. The manufacture of the sealing plug is hence significantly simplified. Since the sealing plug is here a mass-produced article, the design-related simplification and facilitation of the manufacture is particularly desirable.

The latching mechanism can have a latching projection, which engages in a latching recess of the latching mechanism. Preferredly, the latching mechanism has a plurality of latching projections and/or a plurality of latching recesses.

Further preferredly, the latching mechanism is configured in the form of a saw-tooth structure for the self-locking of the band to prevent winding-up thereof. Particularly preferredly, the saw-tooth structure is configured directly on the band. The flanks of the saw teeth are here of such a nature that the number of band windings is easily reducible by a rotation of the inner band end about the longitudinal axis of the sealing plug, but a self-locking is present, which prevents the band from being reeled in, i.e. wound up.

In a further preferred embodiment of the sealing plug, the sleeve has a blind hole, which in the longitudinal direction of the sealing plug has in some sections an enlarged inside radius for the reception of the band. The band, in the tensioned state, is hence held in the longitudinal direction of the sealing plug securely in the sleeve.

In the region of its radially inner band end, the band can have a projection for the centering of the rotary tool. A radially outward running roll-up of the band can thereby be avoided. Preferredly, in the region of its radially inner band end, the band has a plurality of projections for the centering of the rotary tool, and thus for the avoidance of a radially outward running rolling-up of the band. The projection or projections are preferredly configured in one piece with the band.

The radial length of the projection/projections amounts in particular 5% to 45%, preferably 15% to 35%, particularly preferably 20% to 30%, of the inside diameter of the band.

The sleeve can have a cylindrical basic shape. In other words, it can have a substantially equal outside diameter in the axial direction. Alternatively thereto, the outer shell surface of the sleeve can have a conical basic shape in order to fit uniformly snugly against conical anchor holes. Alternatively or additionally thereto, the sleeve can be of stepped configuration on its radial outer face.

The sealing plug is of particularly simple design if the sealing plug consists of the sleeve and the band, wherein the band, in particular, has the latching mechanism. In other words, the sealing plug is in this case merely of two-piece configuration.

In a particularly preferred embodiment of the invention, the band is at least in part fixedly connected, in particular at least in part fixedly cast, to the sleeve. The band is here preferably connected to the sleeve such that, at least between parts of the sleeve and of the band, a relative movement which enables an expansion of the sleeve in the anchor hole is possible. A particularly tightly sealing and compact embodiment of the sealing plug can thereby be obtained.

The object according to the invention is further achieved by a sealing device comprising a previously described sealing plug and a rotary tool for the rotation of the radially inner band end. The rotary tool can here be of manually operated and/or motor-operated configuration.

Finally, the object according to the invention is achieved by a concrete wall having an anchor hole in which a previously described sealing plug is inserted.

Further features and advantages of the invention emerge from the following detailed description of several illustrative embodiments of the invention with reference to the figures of the drawing, which drawing shows details fundamental to the invention, as well as from the claims.

The features represented in the drawing should not necessarily be deemed true-to-scale and are represented such that the particularities according to the invention can be made clearly visible. For reasons of clarity, sectional hatchings are not represented. The various features can each be implemented individually, or in plurality in any chosen combinations in respect of variants of the invention.

BRIEF DESCRIPTION OF THE DRAWINGS

In the drawings:

FIG. 1 shows a perspective view of a disassembled sealing plug;

FIG. 2 shows a top view of the mounted sealing plug;

FIG. 3 shows a sectional view along the plane III-III according to FIG. 2;

FIG. 4 shows a perspective view of the unrolled band of the sealing plug;

DETAILED DESCRIPTION OF THE PREFERRED EMBODIMENTS

Figure 5:
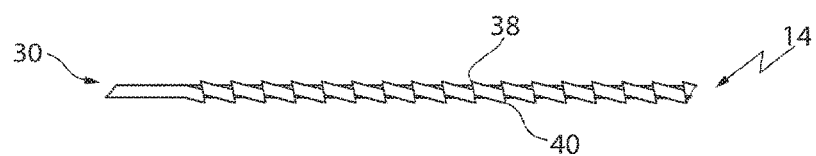
FIG. 5 shows a lateral sectional view of the band according to FIG. 4.

FIG. 1 shows a sealing plug 10. Preferredly, the sealing plug 10 consists of merely two single parts, namely a sleeve 12 and a band 14. The band 14 can be at least in part cast to the sleeve 12, so that the band 14 is captively connected to the sleeve 12. The sleeve 12 is formed in one piece, of polyurethane. The band 14 has a plurality of turns, i.e. a plurality of revolutions or windings. The band 14 is formed in one piece, of spring steel. The sleeve 12 is preferredly configured in rotational symmetry to the longitudinal axis 16 of the sealing plug 10. For the mounting of the sealing plug 10, the band 14 is introduced into the sleeve 12 in the direction of the longitudinal axis 16.

FIG. 2 shows the mounted sealing plug 10. From FIG. 2 it can be seen that, in the region of its radially inner end, the band 14 has a rotating projection 18, which is canted from the band 14. The rotating projection 18 serves for the connection to a rotary tool (see FIG. 7).

FIG. 3 shows a sectioned side view of the sealing plug 10. From FIG. 3 it can be seen that the sealing plug 10 has a blind hole 20, which—viewed in the direction of the longitudinal axis 16 of the sealing plug 10—has in a middle region of the sleeve 12 a radially expanded cylindrical portion 22. By the radially expanded portion 22 are defined two radial constrictions 24, 26 of the sleeve 12, which hold the band 14 axially fixed in the sleeve 12.

FIG. 4 shows the band 14 in the unrolled, i.e. fully unwound state. From FIG. 4 it can be seen that the band 14 is configured in one piece with a latching mechanism 28. The latching mechanism 28 comprises at least one, in particular a plurality of, latching structures 30, 32, 34, 36 configured in the longitudinal direction of the band 14.

FIG. 5 shows, as an example of the latching structures 30, 32, 34, 36, a section through the latching structure 30. The latching structure 30 comprises a multiplicity of saw teeth, of which, for reasons of clarity, merely a first saw tooth 38 and a second saw tooth 40 are provided with a reference symbol. The first saw tooth 38 is configured on the first plane side of the band 14, the second saw tooth 40 on the second plane side of the band 14, wherein the second plane side lies opposite the first plane side. In other words, saw teeth 38, 40 are configured on both plane sides of the band 14.

Figure 6:
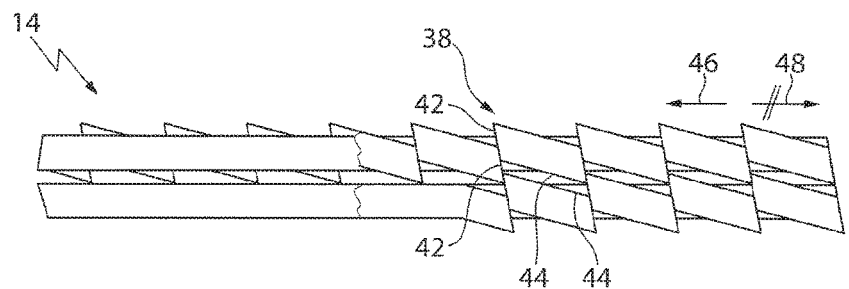
FIG. 6 shows a partially sectioned representation of two layers of the band which are wound one upon the other.

FIG. 6 shows two layers of the band 14 lying one above the other. From FIG. 6 it can be seen that the saw teeth of layers of the band 14 which lie one above the other interlock. The saw teeth—here, for instance, the first saw tooth 38—have a first flank—here, for instance, a first flank 42—and a second flank—here, for instance, a second flank 44. The first flank 42 here forms a greater angle with the longitudinal plane of the band 14 than does the second flank 44. The second flanks 44 thereby slide easily over the first flanks 42, as is represented in FIG. 6 by a first arrow 46. An arrow with lines through it 48 symbolizes, on the other hand, the locking by mutually abutting first flanks 42. As a result, the band 14 can easily be radially expanded and remains in this radially expanded position without winding itself back in again.

Figure 7:
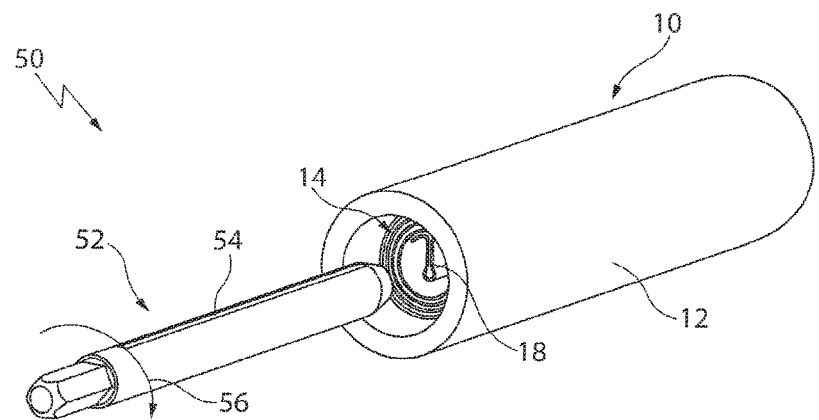
FIG. 7 shows a perspective view of a sealing device comprising the previously stated sealing plug and a rotary tool.

FIG. 7 shows a sealing device 50 comprising the sealing plug 10 and a rotary tool 52. The rotary tool 52 has a longitudinal groove 54, into which the rotating projection 18 can be received. If the rotary tool 52 is rotated in the direction of the arrow 56, the band 14 is radially expanded. By the self-locking of the band 14, the band 14 is prevented from rolling up again when the rotary tool 52, following the expansion, is extracted again from the sealing plug 10. The sealing plug 10 according to the invention thus enables an even radial expansion for the sealing of anchor holes with uniform inside diameter and of anchor holes with conically expanding diameter, wherein the radial expansion is realized evenly without, in the process, axially shortening the sleeve 12.

Figure 8:
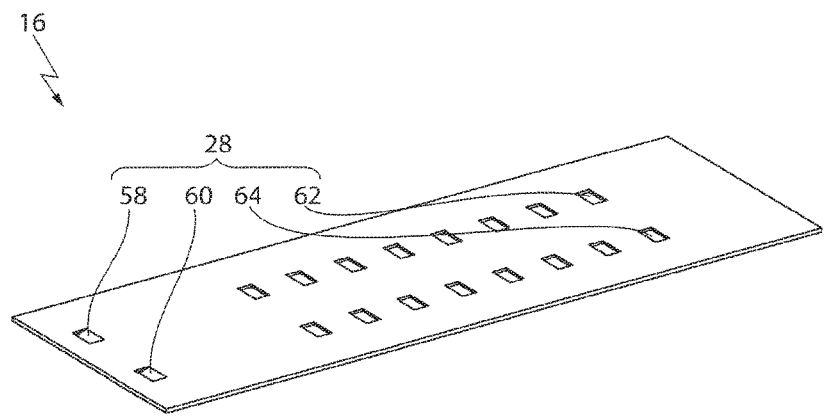
FIG. 8 shows a perspective view of an alternative embodiment of the band.

FIG. 8 shows an alternative embodiment of a band 16. The band 16 is configured in one piece with a latching mechanism 28. The latching mechanism 28 has latching projections 58, 60 which can engage in latching recesses, wherein in FIG. 8, for reasons of clarity, only the latching recesses 62, 64 are provided with reference symbols.

Figure 9:
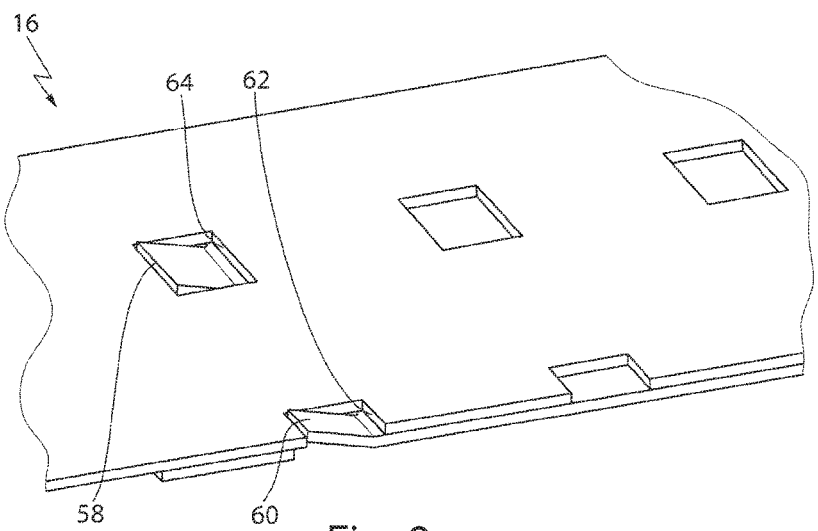
FIG. 9 shows a perspective, partially sectioned view of the alternative embodiment of the band according to FIG. 8 in partially wound-up state.

FIG. 9 shows the band 16 according to FIG. 8 in partially rolled-up state. The latching projections 58, 60 here engage in the latching recesses 62, 64.

Figure 10:
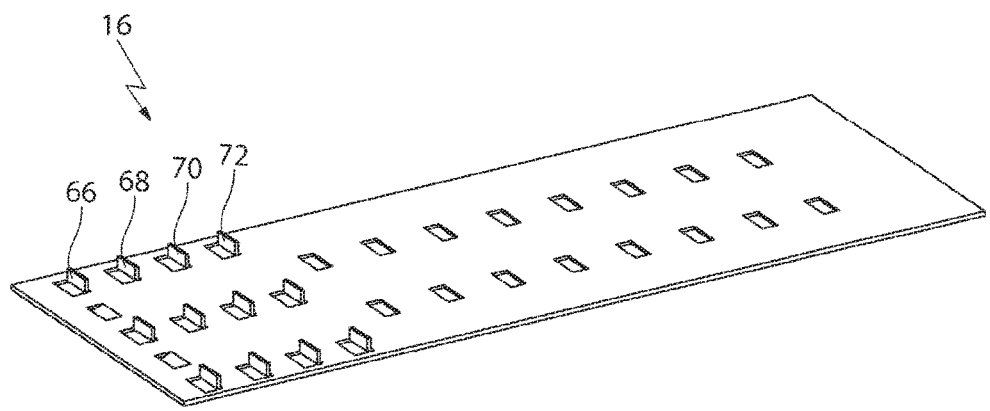
FIG. 10 shows a perspective view of a further alternative embodiment of the band.

FIG. 10 shows a further band 16. In addition to the features of the band 16 represented in FIGS. 8 and 9, the band 16 according to FIG. 10 has a plurality of projections, of which, for reasons of clarity, only the projections 66, 68, 70, 72 are provided with reference symbols.

Figure 11:
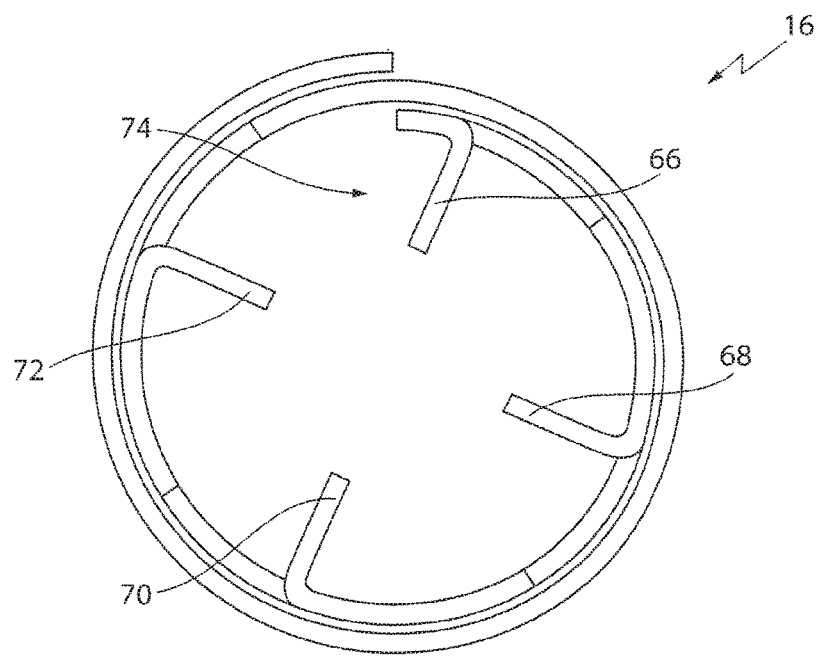
FIG. 11 shows a sectioned side view of a part of the band according to FIG. 10.

FIG. 11 shows a part of the band 16 according to FIG. 10 in rolled-up state. From FIG. 11 it can be seen that the projections 66, 68, 70, 72, in the wound-up state of the band 16, protrude radially inward. The projections 66, 68, 70, 72 center the rotary tool 52 and thereby prevent turnover of the band 16 in the region of its radially inner band end 74 during the rotation of the band 16 with a rotary tool 52 for widening the outside diameter of the band 16. In other words, "a rolling up in the opposite direction", i.e. a rolling up of the radially inner band end 74 in that winding direction of the band 16 which is shown counter to that in FIG. 11, is prevented by the centering of the rotary tool 52 by the projections 66, 68, 70, 72. In addition to the projections 66, 68, 70, 72, a rotating projection (see rotating projection 18 according to FIG. 7) can be provided on the band 16.

In summary, the invention relates to a sealing plug. The sealing plug has an elastic sleeve of thimble-like basic shape. A wound-up band of the sealing plug is inserted in the longitudinal direction of the sleeve. The number of windings or turns of the band can be reduced by rotating the inner end of the band, wherein the outside diameter of the band, and hence the outside diameter of the elastic sleeve, widen. The band can be inserted in pretensioned state into the sleeve and can slacken after insertion into an anchor hole. Alternatively or additionally thereto, the band can be expanded in the anchor hole beyond the slackened state of the band. The outer end of the band can be fixed to the inner wall of the sleeve or be firmly seated in the elastic sleeve during the expansion of the band. The sealing plug further has a latching mechanism, which prevents back-rotation of the expanded sleeve. The latching mechanism is preferredly configured in the form of a tooth-like embossment in the band. The sealing plug enables a radial expansion, and hence a sealing of anchor holes of different diameter, without shortening of the axial sealing surface of the sleeve.

What is claimed is:

1. A sealing plug for closing an anchor hole in a concrete wall, the sealing plug comprising:
   a sleeve extending along a longitudinal axis, wherein the sleeve has at one end of the longitudinal axis an open end and at an opposite end of the longitudinal axis the sleeve has a closed end; and
   a wound band disposed in the sleeve, the wound band for the expansion of the sleeve.

2. The sealing plug as claimed in claim 1, wherein the sleeve is configured in one piece.

3. The sealing plug as claimed in claim 1, wherein the sleeve is formed at least partially of plastic, wherein the plastic has a Shore hardness of 30 ShoreA to 80 ShoreA.

4. The sealing plug as claimed in claim 1, wherein the sleeve is formed at least partially of plastic, wherein the plastic has a Shore hardness of 40 ShoreA to 70 ShoreA.

5. The sealing plug as claimed in claim 1, wherein the sleeve is formed at least partially of plastic, wherein the plastic has a Shore hardness of 50 ShoreA to 60 ShoreA.

6. The sealing plug as claimed in claim 1, wherein the sleeve is formed at least partially of an elastomer, wherein the elastomer is a polyurethane, a thermoplastic or a thermoplastic polyurethane.

7. The sealing plug as claimed in claim 1, wherein the wound band has at its radially inner band end a rotating projection, the rotating projection configured for reception in a rotary tool for the expansion and/or tensioning of the wound band.

8. The sealing plug as claimed in claim 1, wherein the wound band is formed of spring steel.

9. The sealing plug as claimed in claim 1, wherein the sealing plug has a latching mechanism for fixing the winding position of the wound band.

10. The sealing plug as claimed in claim 9, wherein the wound band is configured in one piece with the latching mechanism.

11. The sealing plug as claimed in claim 10, wherein the latching mechanism has a latching projection which engages in a latching recess of the latching mechanism.

12. The sealing plug as claimed in claim 10, wherein the latching mechanism has a saw-tooth structure for the self-locking of the band to prevent winding-up thereof.

13. The sealing plug as claimed in claim 1, wherein the sleeve has a blind hole which in the longitudinal direction of the sealing plug has in some sections an enlarged inside radius for the reception of the band.

14. The sealing plug as claimed in claim 7, wherein in the region of its radially inner band end, the rotating projection comprises a plurality of projections for the centering of the rotary tool in order to avoid a radially outward running rolling-up of the band.

15. The sealing plug as claimed in claim 14, wherein an outer shell surface of the sleeve has a cylindrical basic shape.

16. The sealing plug as claimed in claim 14, wherein an outer shell surface of the sleeve has a conical basic shape.

17. A sealing device comprising a sealing plug as claimed in claim 7, including a rotary tool for the rotation of the radially inner band end.

18. A sealing plug for closing an anchor hole in a concrete wall, the sealing plug comprising:
   a hollow sleeve, wherein the sleeve at one end has a sleeve opening and at an opposite end the sleeve is closed;
      wherein the sleeve is formed as one piece of an elastomer;
      wherein the sleeve has an outer shell surface which is a cylindrical basic shape or a conical basic shape;
      wherein the sleeve comprises an inner radial constriction near the sleeve opening; and
   a wound band disposed in the sleeve;
      wherein the inner radial constriction of the sleeve prevents the wound band from falling out of the sleeve;
      wherein the wound band comprises a latching mechanism for fixing the winding position of the wound band;
      wherein the wound band has at a radially inner band end a rotating projection, the rotating projection configured for reception in a rotary tool for the expansion and/or tensioning of the wound band which in turn is configured for the expansion of the sleeve;
      wherein the wound band, the latching mechanism and the rotating projection are formed as one piece of a spring steel.

19. The sealing plug as claimed in claim 18, wherein the latching mechanism comprises a latching projection and a latching recess, wherein the latching projection engages in the latching recess as the wound band is unwound with the rotary tool.

20. The sealing plug as claimed in claim 18, wherein the latching mechanism comprises a saw-tooth structure for the self-locking of the band to prevent winding-up thereof.

* * * * *